United States Patent
Manolakos et al.

(10) Patent No.: US 11,778,623 B2
(45) Date of Patent: Oct. 3, 2023

(54) PHYSICAL RESOURCE BLOCK BUNDLE SIZE SELECTION

(71) Applicant: QUALCOMM Incorporated, San Diego, CA (US)

(72) Inventors: Alexandros Manolakos, San Diego, CA (US); Jae Won Yoo, San Diego, CA (US); June Namgoong, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/274,932

(22) Filed: Feb. 13, 2019

(65) Prior Publication Data

US 2019/0261325 A1 Aug. 22, 2019

(30) Foreign Application Priority Data

Feb. 16, 2018 (GR) ............................. 20180100066

(51) Int. Cl.
*H04W 72/04* (2009.01)
*H04W 72/23* (2023.01)
*H04L 5/00* (2006.01)

(52) U.S. Cl.
CPC ........... *H04W 72/23* (2023.01); *H04L 5/0053* (2013.01); *H04L 5/0007* (2013.01); *H04L 5/0044* (2013.01); *H04L 5/0048* (2013.01)

(58) Field of Classification Search
CPC ... H04W 72/042; H04W 28/00; H04W 16/00; H04L 5/0053; H04L 5/0007;

(Continued)

(56) References Cited

U.S. PATENT DOCUMENTS 9,008,009 B2 * 4/2015 Roh ................. H04W 72/0486
370/329
10,433,178 B2 * 10/2019 Go ........................ H04L 5/0064
(Continued)

FOREIGN PATENT DOCUMENTS

| CN | 104303440 A | 1/2015 |
| CN | 109511170 A * | 3/2019 |
| CN | 109818711 A | 5/2019 |

OTHER PUBLICATIONS

Sharetechnote (A document that describes different DCI formats, retrieved from internet using web-archive, dated Feb. 3, 2018, https://web.archive.org/web/20180203033045/https://www.sharetechnote.com/html/5G/5G_DCI.html (Year: 2018).*

(Continued)

*Primary Examiner* — Nishant Divecha
(74) *Attorney, Agent, or Firm* — QUALCOMM Incorporated (57) ABSTRACT

Various aspects of the present disclosure generally relate to wireless communication. In some aspects, a user equipment (UE) may receive an indication of a plurality of selectable physical resource block (PRB) bundle sizes. The UE may receive downlink control information (DCI) that does not include a PRB bundling size indicator that indicates a PRB bundle size to be selected from the plurality of selectable PRB bundle sizes. The UE may select a PRB bundle size, from the plurality of selectable PRB bundle sizes, despite the DCI not including the PRB bundling size indicator. Numerous other aspects are provided.

17 Claims, 7 Drawing Sheets

(58) Field of Classification Search
CPC .............. H04L 5/0048; H04L 5/0044; H04Q 2213/13526; H04H 20/42
See application file for complete search history.

(56) References Cited

U.S. PATENT DOCUMENTS

| | | | |
|---|---|---|---|
| 2013/0051265 | A1 | 2/2013 | Barbieri et al. |
| 2014/0348012 | A1 | 11/2014 | Wu |
| 2016/0227520 | A1* | 8/2016 | Davydov ............... H04L 5/00 |
| 2017/0339667 | A1 | 11/2017 | Shen et al. |
| 2018/0324760 | A1* | 11/2018 | Yuk ................ H04L 5/0044 |
| 2020/0146035 | A1* | 5/2020 | Kim ................ H04L 5/0094 |
| 2020/0288445 | A1 | 9/2020 | Su et al. |

OTHER PUBLICATIONS

Translation for CN-109511170-A (Year: 2017).*
Interdigital Inc: "PRG Size Indication in NR", 3GPP Draft; 3GPP TSG RAN WG1 NR Ad-Hoc #2, R1-1710922, PRG Size Indication in NR, 3rd Generation Partnership Project (3GPP), Mobile Competence Centre, 650, Route Des Lucioles, F-06921 Sophia-Antipolis, Cedex, France, vol. RAN WG1, No. Qingdao, P.R. China; Jun. 27, 2017-Jun. 30, 2017, Jun. 26, 2017 (Jun. 26, 2017), XP051300123, 4 Pages, Retrieved from the Internet: URL:http://www.3gpp.org/ftp/Meetings_3GPP_SYNC/RAN1/Docs/ [retrieved on Jun. 26, 2017] p. 3; table 2.
International Search Report and Written Opinion—PCT/US2019/018026—ISA/EPO—dated Apr. 18, 2019.
Spreadtrum Communications: "Discussion on PRB Bundling Size for NR DL", 3GPP Draft; 3GPP TSG RAN WG1 NR Ad-Hoc #2, R1-1710360, Disucssion on PRB Bundling Size for NR DL-Final, 3rd Generation Partnership Project (3GPP), Mobile Competence Centre, 650, Route Des Lucioles, F-06921 Sophia-Antipolis, Cedex, vol. RAN WG1, No. Qingdao, P.R. China, Jun. 27, 2017-Jun. 30, 2017, Jun. 16, 2017 (Jun. 16, 2017), XP051304281, 4 Pages, Retrieved from the Internet: URL:http://www.3gpp.org/ftp/tsg_ran/WG1_RL1/TSGR1_AH/NR_AH_1706/Docs/ [retrieved on Jun. 16, 2017].
Spreadtrum Communication: "Discussion on PRB Bundling Size Indication for NR DL", 3GPP Draft; 3GPP TSG RAN WG1 Meeting #90, R1-1713054 Discussion on PRB Bundling Size Indication for NR DL, 3rd Generation Partnership Project (3GPP), Mobile Competence Centre, 650, Route Des Lucioles, F-06921 Sophia-Antipolis, CE, vol. RAN WG1, No. Prague, Czech Rep, Aug. 21, 2017-Aug. 25, 2017, Aug. 20, 2017 (Aug. 20, 2017), XP051315863, 2 pages, Retrieved from the Internet: URL:http://www.3gpp.org/ftp/Meetings_3GPP_SYNC/RAN1/Docs/ [retrieved on Aug. 20, 2017].
3GPP TS 38.212, "3rd Generation Partnership Project; Technical Specification Group Radio Access Network; NR; Multiplexing and Channel Coding (Release 15)," 3GPP Standard; Technical Specification; 3GPP TS 38.212, 3rd Generation Partnership Project (3GPP), Mobile Competence Centre; 650, Route Des Lucioles; F-06921 Sophia-Antipolis Cedex; France, vol. RAN WG1, No. V15.0.0, Dec. 2017, Jan. 3, 2018, pp. 1-82, XP051392262, [retrieved on Jan. 3, 2018] section 7.3.1.2.1.
CATT: "PRB Bundling for DL Transmission", R1-1720180, 3GPP TSG RAN WG1 Meeting #91, Reno, USA, Nov. 27-Dec. 1, 2017, 2 pages.
Intel Corporation: "Remaining Issues of PRB Bundling", R1-1800308, 3GPP TSG RAN WG1 Meeting AH 1801, Vancouver, Canada, Jan. 22-26, 2018, pp. 1-3.
OPPO: "Text Proposal for DL PRB Bundling", 3GPP Draft, 3GPP TSG RAN WG1 Meeting AH 1801, R1-1800497, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 12, 2018 (Jan. 12, 2018), XP051384360, 3 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 12, 2018], paragraph [0002].
Qualcomm Incorporated: "Discussion on PRB Bundling for DL", R1-1720659, 3GPP TSG RAN WG1 Meeting 91, Reno, USA, Nov. 27-Dec. 1, 2017, pp. 1-7.
Huawei, et al., "PRB Bundling Size for DL Data Precoding," 3GPP TSG RAN WG1 Meeting #88, R1-1703342, Athens, Greece, Feb. 13-17, 2017, 7 pages.
Huawei, et al., "PRB Bundling Size for DL Data Precoding", 3GPP TSG RAN WG1 Meeting #89, R1-1708133, Hangzhou, China, May 15-19, 2017, 8 Pages, sections 1-3.
OPPO: "Text Proposal for DL PRB Bundling", 3GPP TSG RAN WG1 Meeting #92, R1-1802127, Athens, Greece, Feb. 26-Mar. 2, 2018, 2 Pages.
Taiwan Search Report—TW108104936—TIPO—dated Mar. 13, 2022.

* cited by examiner

PHYSICAL RESOURCE BLOCK BUNDLE SIZE SELECTION

CROSS-REFERENCE TO RELATED APPLICATIONS UNDER 35 U.S.C. § 119

This application claims priority to Greek Patent Application No. 20180100066, filed on Feb. 16, 2018, entitled "TECHNIQUES AND APPARATUSES FOR PHYSICAL RESOURCE BLOCK BUNDLE SIZE SELECTION," which is hereby expressly incorporated by reference herein.

FIELD OF THE DISCLOSURE

Aspects of the present disclosure generally relate to wireless communication, and more particularly to techniques and apparatuses for physical resource block (PRB) bundle size selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of a plurality of selectable physical resource block (PRB) bundle sizes; receiving downlink control information (DCI) that does not include a PRB bundling size indicator that indicates a PRB bundle size to be selected from the plurality of selectable PRB bundle sizes; and selecting a PRB bundle size, from the plurality of selectable PRB bundle sizes, despite the DCI not including the PRB bundling size indicator.

In some aspects, a UE for wireless communication may include memory and one or more processors operatively coupled to the memory. The memory and the one or more processors may be configured to receive an indication of a plurality of selectable physical resource block (PRB) bundle sizes; receive downlink control information (DCI) that does not include a PRB bundling size indicator that indicates a PRB bundle size to be selected from the plurality of selectable PRB bundle sizes; and select a PRB bundle size, from the plurality of selectable PRB bundle sizes, despite the DCI not including the PRB bundling size indicator.

In some aspects, a non-transitory computer-readable medium may store one or more instructions for wireless communication. The one or more instructions, when executed by one or more processors of a UE, may cause the one or more processors to receive an indication of a plurality of selectable physical resource block (PRB) bundle sizes; receive downlink control information (DCI) that does not include a PRB bundling size indicator that indicates a PRB bundle size to be selected from the plurality of selectable PRB bundle sizes; and select a PRB bundle size, from the plurality of selectable PRB bundle sizes, despite the DCI not including the PRB bundling size indicator.

In some aspects, an apparatus for wireless communication may include means for receiving an indication of a plurality of selectable physical resource block (PRB) bundle sizes; means for receiving downlink control information (DCI) that does not include a PRB bundling size indicator that indicates a PRB bundle size to be selected from the plurality of selectable PRB bundle sizes; and means for selecting a PRB bundle size, from the plurality of selectable PRB bundle sizes, despite the DCI not including the PRB bundling size indicator.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
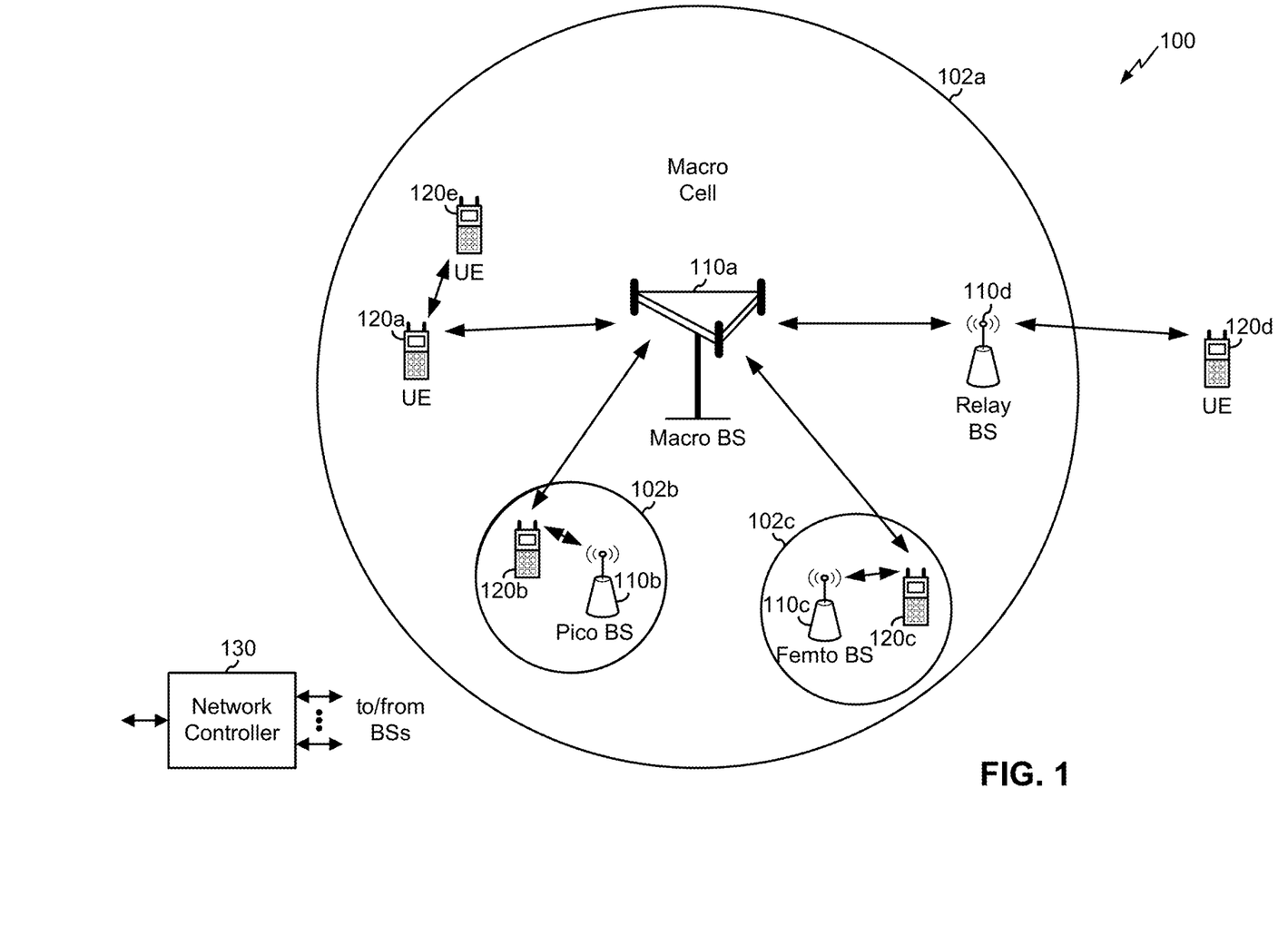
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
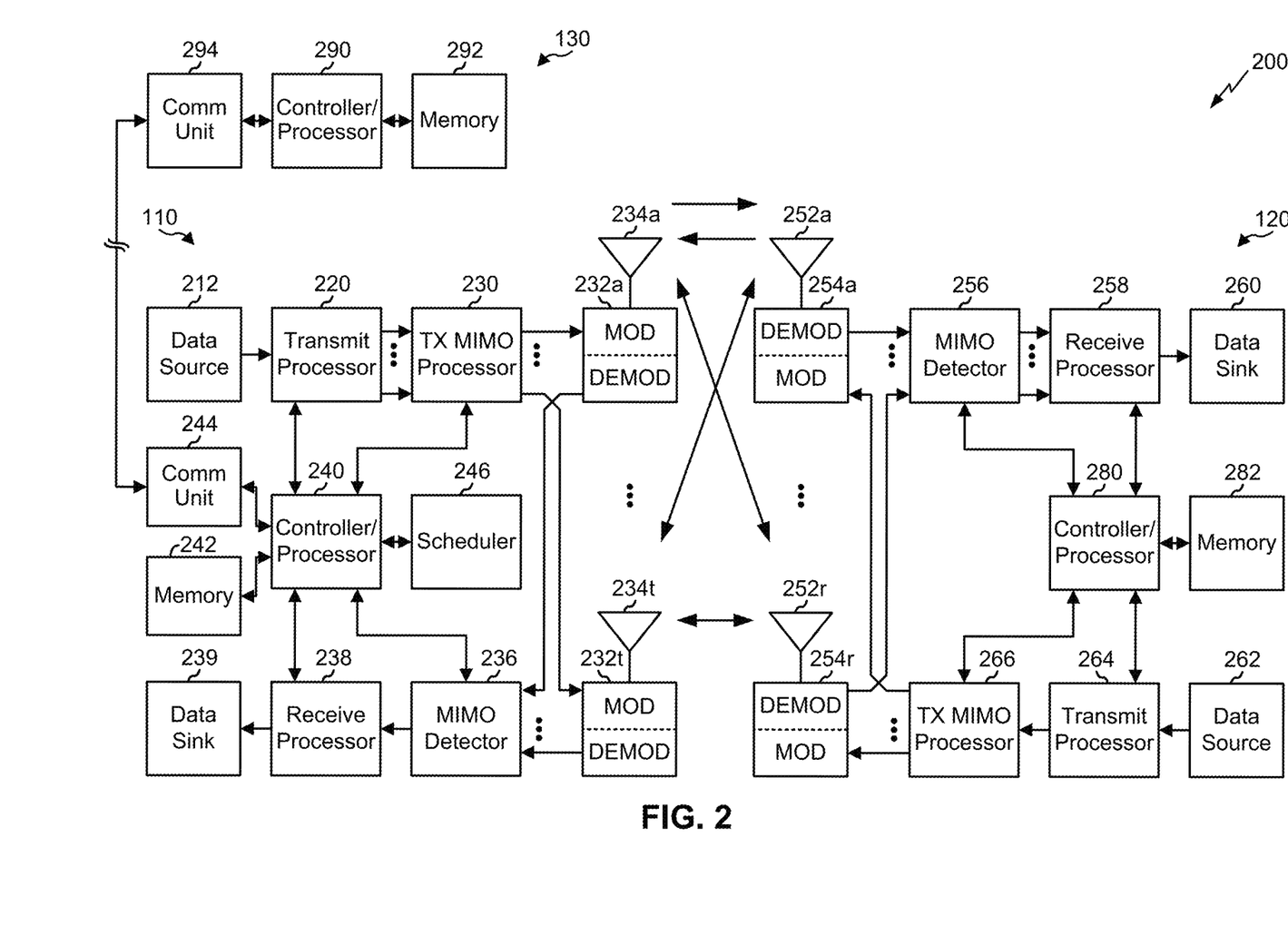
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with PRB bundle size selection, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of a plurality of selectable physical resource block (PRB) bundle sizes; means for receiving downlink control information (DCI) that does not include a PRB bundling size indicator that indicates a PRB bundle size to be selected from the plurality of selectable PRB bundle sizes; means for selecting a PRB bundle size, from the plurality of selectable PRB bundle sizes, despite the DCI not including the PRB bundling size indicator; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
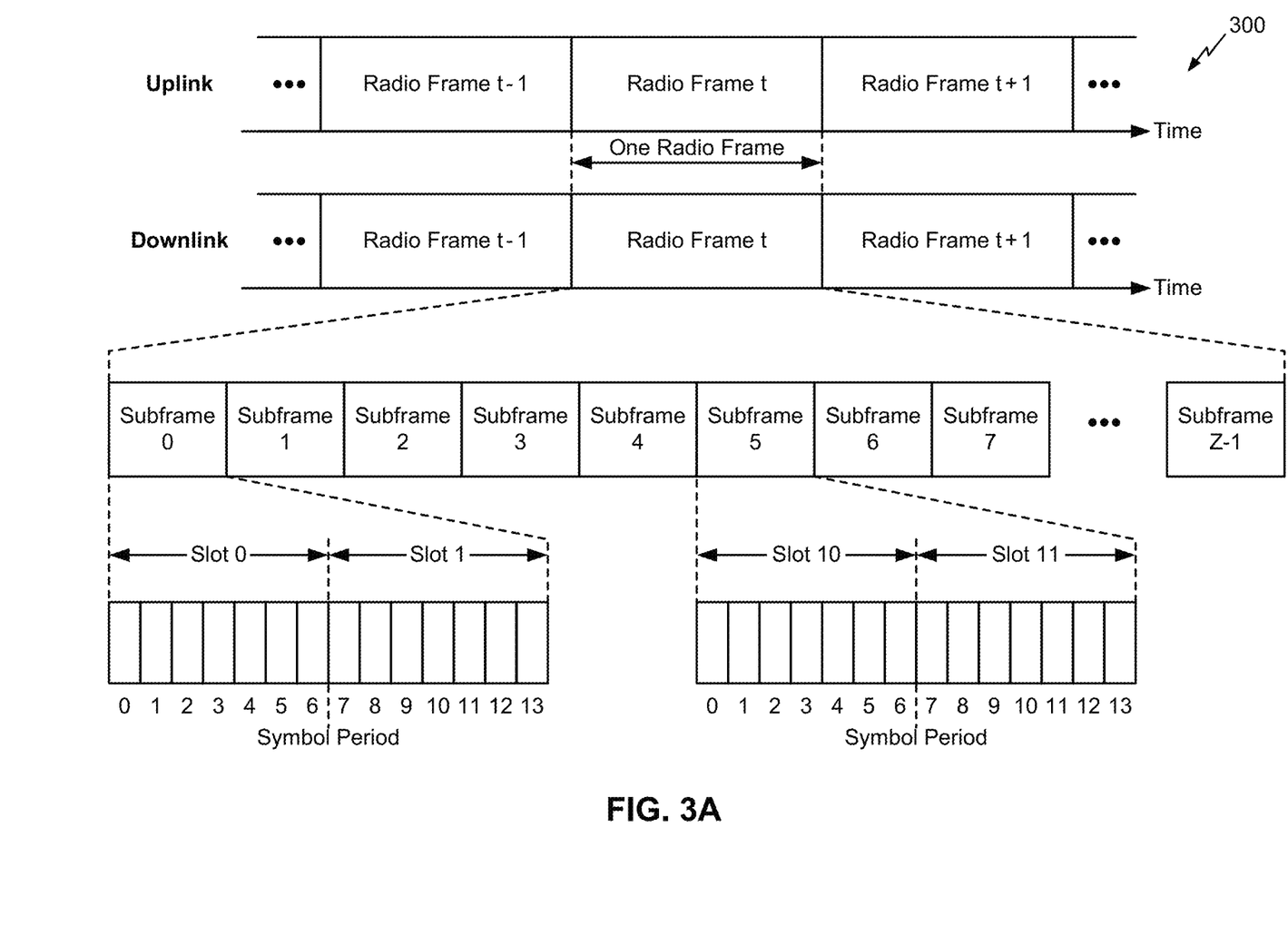
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
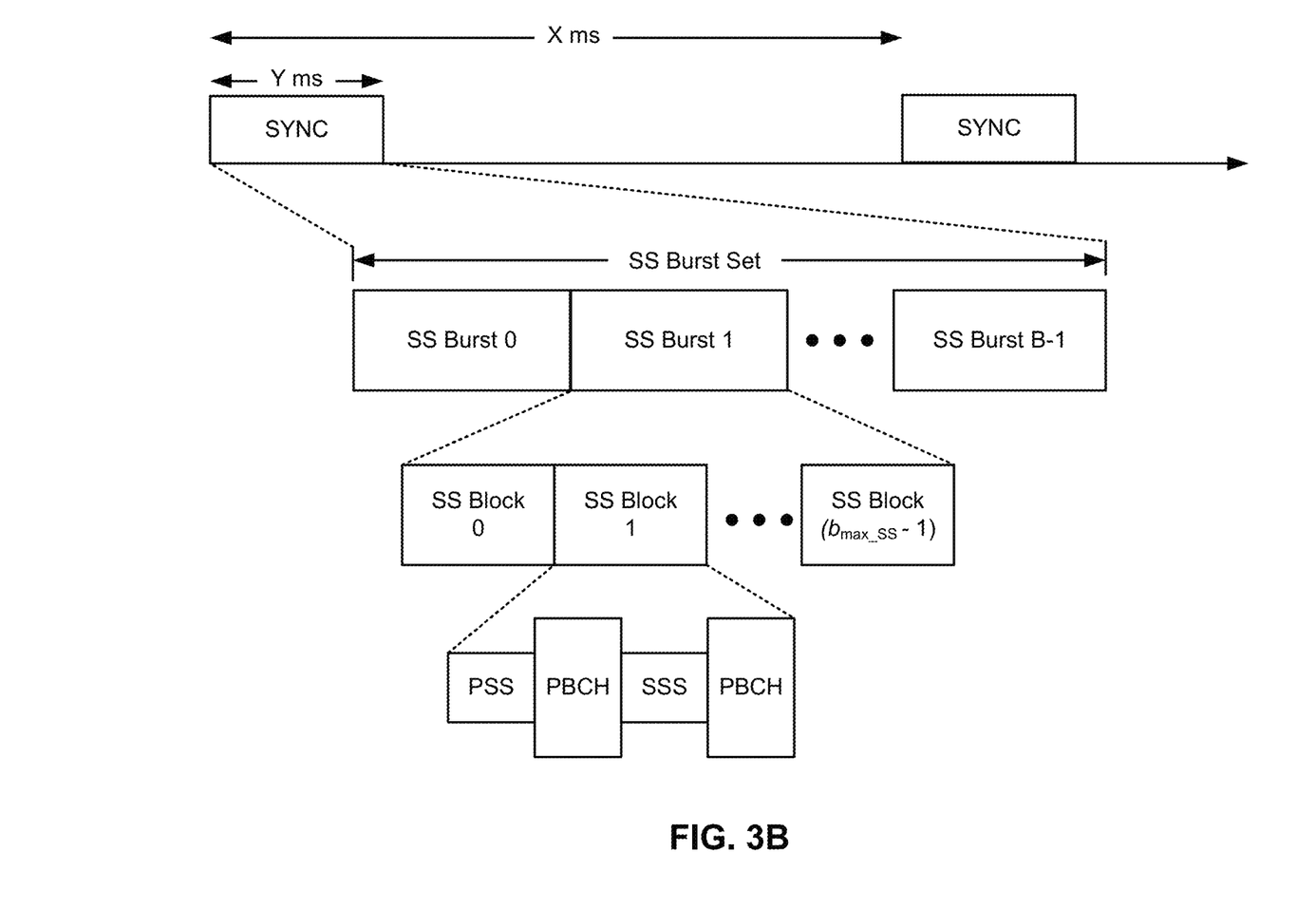
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
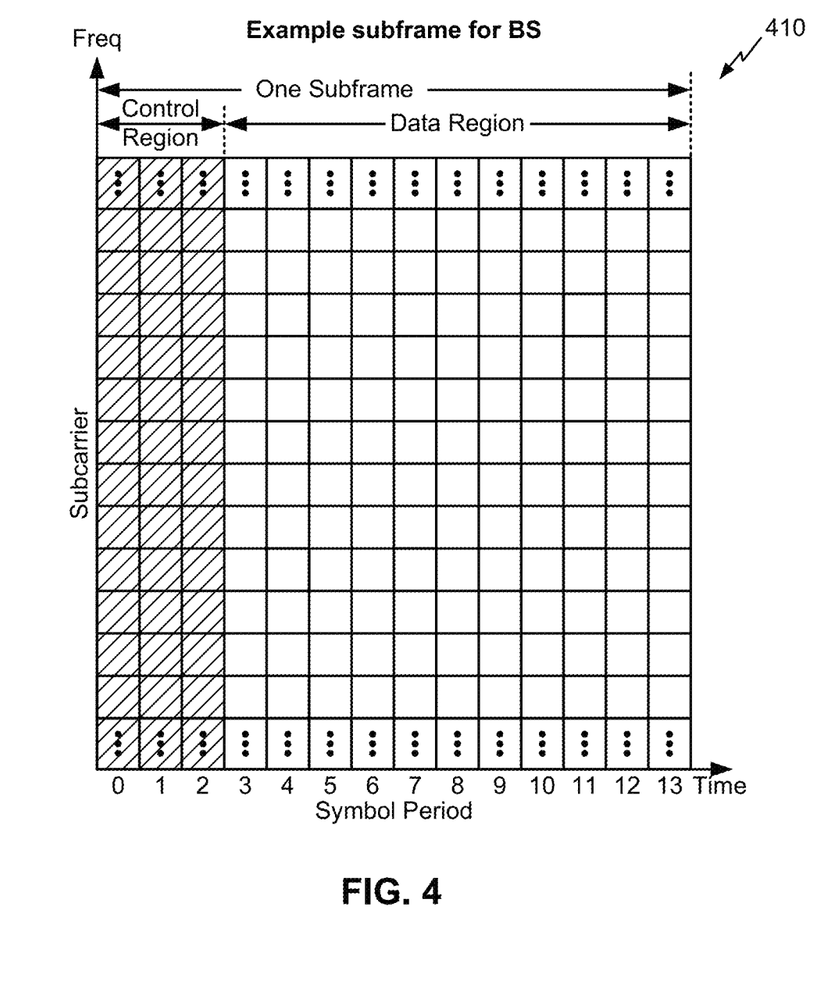
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks (RBs), also referred to herein as physical resource blocks (PRBs). Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
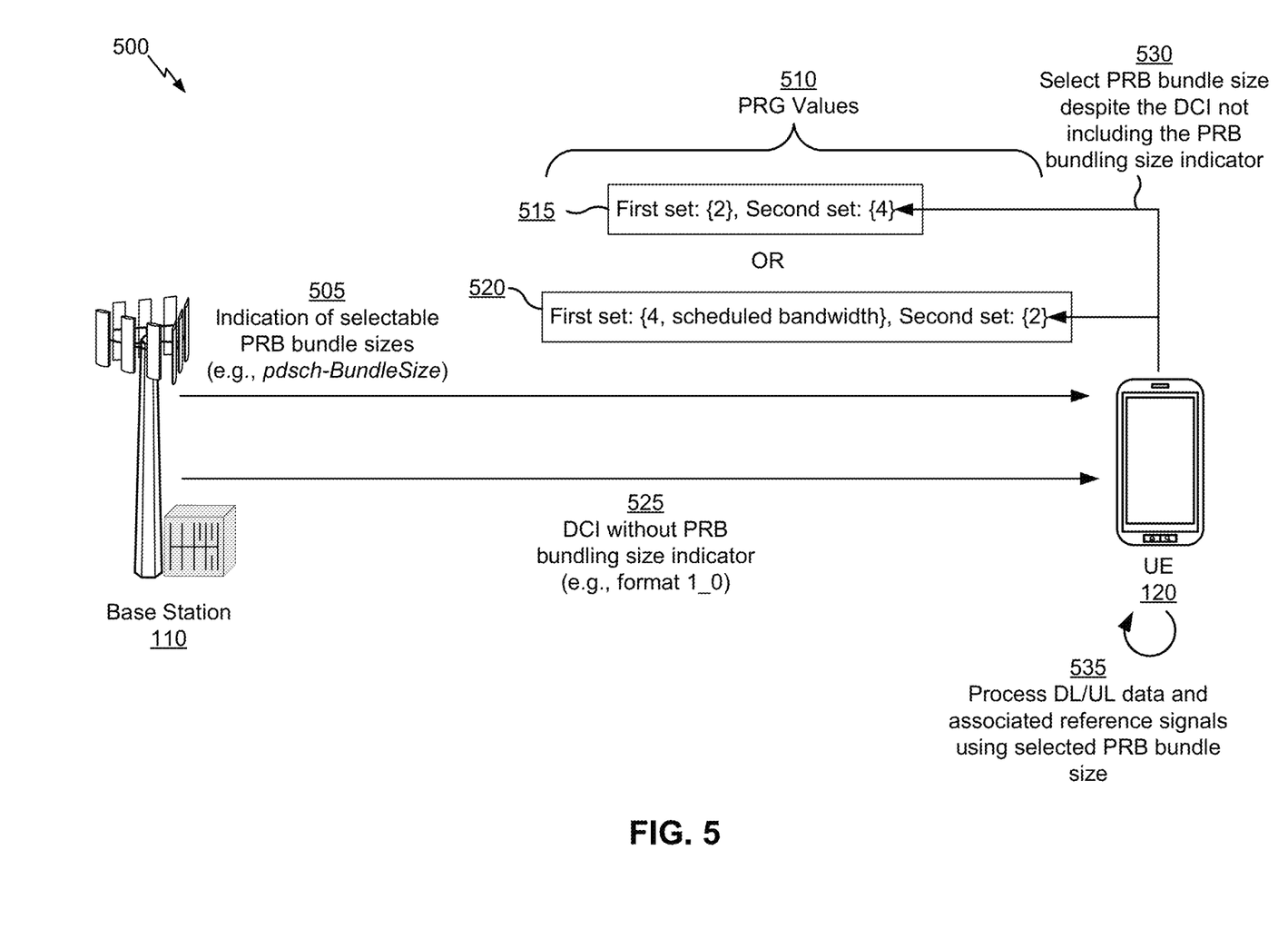
FIG. 5 is a diagram illustrating an example of PRB bundle size selection, in accordance with various aspects of the present disclosure.

FIG. 5 is a diagram illustrating an example 500 of PRB bundle size selection, in accordance with various aspects of the present disclosure.

As shown in FIG. 5, a base station 110 and a UE 120 may communicate with one another. In some aspects, the base station 110 and the UE 120 may communicate using PRB bundling, where the same precoding matrix is used to precode all of the PRBs in the PRB bundle in order to improve channel estimation. For example, the base station 110 may precode multiple PRBs (e.g., PRBs that are contiguous in frequency, PRBs that are non-contiguous in frequency, and/or the like) using the same precoding matrix, and may transmit those PRBs to the UE 120. The UE 120 may perform joint channel estimation across the PRBs to achieve higher channel estimation accuracy (e.g., as compared to performing separate channel estimation for each PRB when each PRB could be precoded using different precoding matrices).

In some aspects, the base station 110 may configure a PRB bundle size, which represents a number of PRBs to be included in a PRB bundle (e.g., based at least in part on channel conditions and/or the like), and may indicate the PRB bundle size to the UE 120. For example, the base station 110 may configure a PRB bundle size per bandwidth part used by the UE 120 to communicate with the base station 110. In some aspects, the UE 120 may use a default PRB bundle size (e.g., of 2 PRBs) for broadcast PDSCH communications, multi-cast PDSCH communications, and/or unicast PDSCH communications prior to a radio resource control (RRC) configuration. However, after RRC configuration (e.g., for unicast PDSCH communications), the UE 120 may use a PRB bundle size indicated by the base station 110.

For example, the base station 110 may indicate a group of selectable PRB bundle sizes (e.g., a common PRB bundling size set) in the RRC configuration, and may indicate a particular PRB bundle size, from the group, to be used by the UE 120 for a scheduled PDSCH communication. In this way, the base station 110 and the UE 120 may be capable of supporting different PRB bundle sizes for different scenarios (e.g., channel reciprocity, channel non-reciprocity, different Tx or Rx beamforming scenarios, and/or the like) using a common set of selectable PRB bundle sizes configured during RRC configuration.

In some aspects, if the UE 120 supports dynamic PRB bundling, then the base station 110 may indicate a particular PRB bundle size, from a group of RRC-configured PRB bundle sizes, using downlink control information (DCI). The PRB bundle size indicated in DCI may be applied to PDSCH communications scheduled via the DCI. The indication of the PRB bundle size may be referred to as a PRB bundling size indicator, and may be a 1-bit indication in DCI. However, the base station 110 and the UE 120 may support different DCI formats (e.g., format 1_1, format 1_0, and/or the like), and one or more DCI formats may not include a PRB bundling size indicator. For example, DCI format 1_0, which may be referred to as fallback DCI, may not include a PRB bundling size indicator. Additionally, or alternatively, a PRB bundling size indicator may not be included in DCI having format 1_1 (e.g., when a bandwidth part has been sized to accommodate smaller DCI size than the typical size of DCI having format 1_1, and one or more fields of the DCI are not included). If the UE 120 receives such fallback DCI and/or DCI where the PRB bundling size indicator is not included, then the UE 120 may not be able to determine which PRB bundle size, of the group of RRC-configured PRB bundle sizes, to be used for PDSCH communications scheduled via the fallback DCI. Some techniques and apparatuses described herein permit the UE 120 to select a PRB bundle size despite receiving DCI that does not include a PRB bundling size indicator. In this way, the UE 120 and the base station 110 may reduce communication errors, and may be capable of achieving channel estimation improvements associated with PRB bundling.

As shown by reference number 505, the base station 110 may transmit, and the UE 120 may receive, an indication of a plurality of selectable PRB bundle sizes. In some aspects, the indication of the plurality of selectable PRB bundle sizes may be included in an RRC message (e.g., an RRC configuration message, an RRC reconfiguration message, and/or the like). Additionally, or alternatively, the base station 110 may transmit, and the UE 120 may receive (e.g., in an RRC message), an indication of whether PRB bundling is enabled or disabled for the UE 120.

As shown by reference number 510, the plurality of selectable PRB bundle sizes may include a first set of precoding resource block group (PRG) values and a second set of PRG values. A PRG value may indicate a PRB bundle size. For example, a PRG value of 2 may indicate a PRB bundle size of 2 (e.g., 2 PRBs are precoded using the same precoding matrix, and are received using joint channel estimation), a PRG value of 4 may indicate a PRB bundle size of 4, a PRG value of "scheduled bandwidth" may indicate a PRB bundle size that corresponds to a size of bandwidth that is scheduled by a particular DCI (e.g., a bandwidth that includes all PRBs scheduled by the DCI), and/or the like. In some aspects, the first set of PRG values may include one PRG value or two PRG values selected from the group of {2, 4, scheduled bandwidth}, and the second set of PRG values may include a single PRG value. In some aspects, the first set of PRG values may include {2}, {4}, {scheduled bandwidth}, {2, scheduled bandwidth}, or {4, scheduled bandwidth}, and may not include {2, 4}.

As shown by reference number 515, in some aspects, the first set of PRG values may include a single PRG value, and the second set of PRG values may include a single PRG value. In this case, if the UE 120 were to receive DCI (e.g., of format 1_1) that includes a PRB bundling size indicator with a first value (e.g., 0), then the UE 120 would use the single PRG value from the second set (e.g., in example 500, a PRG value of 4) when receiving PDSCH communications scheduled by the same DCI. Alternatively, if the UE 120 were to receive DCI that includes a PRB bundling size indicator with a second value (e.g., 1), then the UE 120 would use the single PRG value from the first set (e.g., in example 500, a PRG value of 2) when receiving PDSCH communications scheduled by the same DCI. However, if the UE 120 were to receive DCI (e.g., of format 1_0, of format 1_1 where the PRB bundling size indicator is not included, and/or the like) that does not include a PRB bundling size indicator, then the UE 120 may not be able to determine which PRG value to use. As described in more detail below, some techniques and apparatuses described herein permit the UE 120 to determine a PRG value to be used when the UE 120 receives such DCI. The PRG values shown in FIG. 5 are provided as an example, and other PRG values may be used.

As shown by reference number 520, in some aspects, the first set of PRG values may include two PRG values, and the second set of PRG values may include a single PRG value. In this case, if the UE 120 were to receive DCI that includes a PRB bundling size indicator with a first value (e.g., 0), then the UE 120 would select the single PRG value from the second set (e.g., in example 500, a PRG value of 2). Alternatively, if the UE 120 were to receive DCI that includes a PRB bundling size indicator with a second value (e.g., 1), then the UE 120 would select one of the two PRG values from the first set. For example, if the PRBs scheduled by the DCI are contiguous, and the size of the scheduled PRBs is larger than half the size of the bandwidth part configured for the UE 120, then the UE 120 may select the PRG value of "scheduled bandwidth" (e.g., shown as the second value of the first set). Alternatively, if the PRBs scheduled by the DCI are not contiguous, and/or if the size of the scheduled PRBs is less than or equal to half the size of the bandwidth part, then the UE 120 may select the PRG value other than "scheduled bandwidth" (e.g., shown as the first value of the first set, or a value of 4 in example 500). However, if the UE 120 were to receive DCI that does not include a PRB bundling size indicator, then the UE 120 may not be able to determine which PRG value to use, as indicated above. As described in more detail below, some techniques and apparatuses described herein permit the UE 120 to determine a PRG value to be used when the UE 120 receives such DCI. The PRG values shown in FIG. 5 are provided as an example, and other PRG values may be used.

As shown by reference number 525, the base station 110 may transmit, and the UE 120 may receive, DCI that does not include a PRB bundling size indicator that indicates a PRB bundle size to be selected from the plurality of selectable PRB bundle sizes. For example, the DCI may include fallback DCI, DCI with a format of 1_0, DCI with a format of 1_1 that does not include the PRB bundling size indicator, and/or the like.

As shown by reference number 530, the UE 120 may select a PRB bundle size, from the plurality of selectable PRB bundle sizes, despite the DCI not including the PRB bundling size indicator. In some aspects, the UE 120 may select the PRB bundle size based at least in part on information hard coded in memory of the UE 120 (e.g., based at least in part on a 3GPP standard). For example, the UE 120 may store a default PRB bundle size, and may select the default PRB bundle size when the UE 120 receives DCI that does not include a PRB bundling size indicator. Additionally, or alternatively, the UE 120 may store a rule that indicates a PRB bundle size (e.g., a PRG value) to be selected from the plurality of selectable PRB bundle sizes when the UE 120 receives DCI that does not include a PRB bundling size indicator.

For example, when the UE 120 receives DCI that does not include a PRB bundling size indicator, the UE 120 may select a PRG value from the first set of PRG values. In this case, if the first set includes a single PRG value, then the UE 120 may select the single PRG value from the first set. In some aspects, if the first set includes two PRG values, then the UE 120 may select a first PRG value of the two PRG values (e.g., a PRG value other than "scheduled bandwidth," a PRG value of 2, a PRG value of 4, and/or the like). Alternatively, if the first set includes two PRG values, then the UE 120 may select a second PRG value of the two PRG values (e.g., a PRG value of "scheduled bandwidth").

As another example, when the UE 120 receives DCI that does not include a PRB bundling size indicator, the UE 120 may select a PRG value from the second set of PRG values. In this case, since the second set of PRG values include a single PRG value, then the UE 120 may select the single PRG value from the second set.

As another example, when the UE 120 receives DCI that does not include a PRB bundling size indicator, the UE 120 may select a default PRG value (e.g., a PRG value of 2, a PRG value of 4, and/or the like). As another example, when the UE 120 receives DCI that does not include a PRB bundling size indicator, the UE 120 may select a PRG value, from the plurality of indicated PRG values (e.g., in the first set and/or the second set), based at least in part on a parameter. For example, a value of the parameter and/or one or more bits of the parameter may be mapped to a PRG value in the first set (e.g., a single PRG value in the first set, a first PRG value of two PRG values included in the first set, or a second PRG value of two PRG values included in the first set) or a PRG value in the second set (e.g., a single PRG value in the first set). The parameter may include, for example, a slot index associated with downlink data granted by the DCI (e.g., a slot index of the first slot that carries the downlink data), a symbol index associated with downlink data granted by the DCI (e.g., a symbol index of the first symbol that carries the downlink data), a UE identifier associated with the UE 120 (e.g., a cell radio network temporary identifier (C-RNTI) and/or the like), a cell index associated with a serving cell of the UE, and/or the like.

As shown by reference number 535, the UE 120 may process downlink data and/or uplink data and associated reference signals according to the selected PRB bundle size. In some aspects, the UE 120 may process downlink data and one or more associated reference signals according to the selected PRB bundle size. For example, the UE 120 may perform joint channel estimation for PRBs included in a PRB bundle having the selected PRB bundle size. In some aspects, the UE 120 may precode and/or transmit uplink data and one or more associated reference signals according to the selected PRB bundle size. For example, the UE 120 may precode multiple PRBs, included in a PRB bundle having the selected PRB bundle size, using the same precoder. In this way, the UE 120 and the base station 110 may reduce communication errors, and may be capable of achieving channel estimation improvements associated with PRB bundling, despite the UE 120 receiving DCI that does not include a PRB bundling size indicator.

As indicated above, FIG. 5 is provided as an example. Other examples are possible and may differ from what was described with respect to FIG. 5.

Figure 6:
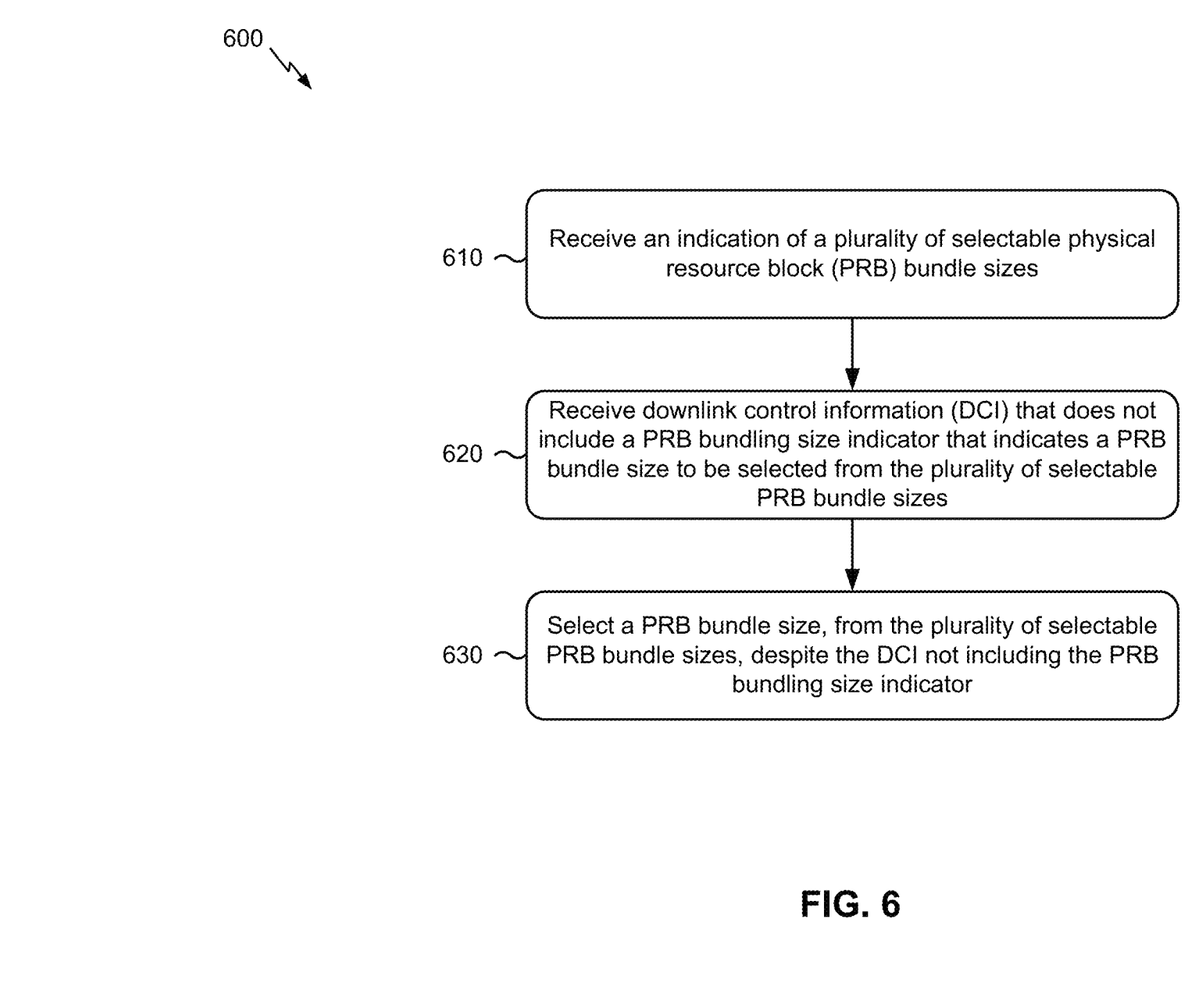
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs PRB bundle size selection.

As shown in FIG. 6, in some aspects, process 600 may include receiving an indication of a plurality of selectable physical resource block (PRB) bundle sizes (block 610). For example, the UE may receive (e.g., using antenna 252, DEMOD 254, MIMO detector 256, receive processor 258, controller/processor 280, and/or the like) an indication of a plurality of selectable PRB bundle sizes, as described above in connection with FIG. 5.

As further shown in FIG. 6, in some aspects, process 600 may include receiving downlink control information (DCI) that does not include a PRB bundling size indicator that indicates a PRB bundle size to be selected from the plurality of selectable PRB bundle sizes (block 620). For example, the UE may receive (e.g., using antenna 252, DEMOD 254, MIMO detector 256, receive processor 258, controller/processor 280, and/or the like) DCI that does not include a PRB bundling size indicator that indicates a PRB bundle size to be selected from the plurality of selectable PRB bundle sizes, as described above in connection with FIG. 5.

As further shown in FIG. 6, in some aspects, process 600 may include selecting a PRB bundle size, from the plurality of selectable PRB bundle sizes, despite the DCI not including the PRB bundling size indicator (block 630). For example, the UE may select (e.g., using controller/processor 280 and/or the like) a PRB bundle size, from the plurality of selectable PRB bundle sizes, despite the DCI not including the PRB bundling size indicator, as described above in connection with FIG. 5.

Process 600 may include additional aspects, such as any single aspect or any combination of aspects described below.

In some aspects, the UE may process downlink data and one or more associated reference signals according to the selected PRB bundle size. In some aspects, the UE may precode and transmit uplink data and one or more associated reference signals according to the selected PRB bundle size. In some aspects, the DCI is one of: a DCI having format 1_0, or a DCI having format 1_1, wherein the PRB bundling size indicator is not included in the DCI having format 1_1. In some aspects, the PRB bundle size is selected based at least in part on information hard coded in memory of the UE. In some aspects, the information indicates a default PRB bundle size, and wherein selecting the PRB bundle size comprises selecting the default PRB bundle size.

In some aspects, the plurality of selectable PRB bundle sizes includes a first set of precoding resource block group (PRG) values and a second set of PRG values. In some aspects, the first set includes a single PRG value and the second set includes a single PRG value. In some aspects, the UE selects the PRB bundle size as one of: the single PRG value from the first set, the single PRG value from the second set, or a default PRG value. In some aspects, the UE selects either the single PRG value from the first set or the single PRG value from the second set based at least in part on a parameter. In some aspects, the parameter includes at least one of: a slot index associated with downlink data granted by the DCI, a symbol index associated with downlink data granted by the DCI, a cell radio network temporary identifier (C-RNTI) associated with the UE, a cell index associated with a serving cell of the UE, or some combination thereof.

In some aspects, the first set includes two PRG values and the second set includes a single PRG value. In some aspects, the UE selects the PRB bundle size as one of: the single PRG value from the second set, a first PRG value of the two PRG values from the first set, a second PRG value of the two PRG values from the first set, or a default PRG value. In some aspects, the first PRG value indicates a PRB bundle size of 2 or 4. In some aspects, the second PRG value indicates a PRB bundle size corresponding to a size of a scheduled bandwidth that is scheduled by the DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be openended terms. Further, the phrase "based on" is intended to mean "based, at least in part, on" unless explicitly stated otherwise.

What is claimed is:

1. A method of wireless communication performed by a user equipment (UE), comprising:
   receiving an indication of a plurality of selectable physical resource block (PRB) bundle sizes;
   receiving downlink control information (DCI) that does not include a PRB bundling size indicator that indicates a PRB bundle size to be selected from the plurality of selectable PRB bundle sizes; and
   selecting a first value from a set of precoding resource block group (PRG) value as a PRB bundling size in response to determining that the received DCI comprises a DCI format 1_1 and in response to determining that the received DCI does not include the PRB bundling size indicator due to a bandwidth part configuration, upon receiving the plurality of selectable physical resource block (PRB) bundle sizes.

2. The method of claim 1, further comprising processing downlink data and one or more associated reference signals according to the selected PRB bundle size.

3. The method of claim 1, further comprising precoding and transmitting uplink data and one or more associated reference signals according to the selected PRB bundle size.

4. The method of claim 1, wherein the plurality of selectable PRB bundle sizes includes a first set of PRG values and a second set of PRG values.

5. The method of claim 4, wherein the first set of PRG values includes a single PRG value and the second set of PRG values includes a single PRG value.

6. The method of claim 5, wherein the UE selects either a single PRG value from the first set of PRG values or a single PRG value from the second set of PRG values based at least in part on a parameter.

7. The method of claim 4, wherein the first set of PRG values includes two PRG values and the second set of PRG values includes a single PRG value.

8. The method of claim 7, wherein the second PRG value indicates a PRB bundle size corresponding to a size of a scheduled bandwidth that is scheduled by the DCI.

9. The method of claim 1, wherein the plurality of selectable PRB bundle sizes includes a first set of precoding resource block group (PRG) values, that includes one or more PRG values, and a second set of PRG values that includes a single PRG value, and wherein the method further comprises:
selecting the PRB bundle size as the single PRG value from the second set.

10. A user equipment (UE) for wireless communication, comprising:
memory; and
one or more processors coupled to the memory, the memory and the one or more processors configured to:
receive an indication of a plurality of selectable physical resource block (PRB) bundle sizes;
receive downlink control information (DCI) that does not include a PRB bundling size indicator that indicates a PRB bundle size to be selected from the plurality of selectable PRB bundle sizes; and
select a first value from a set of precoding resource block group (PRG) values as a PRB bundling size in response to determining that the received DCI comprises a DCI format 1_1 and in response to determining that the received DCI does not include the PRB bundling size indicator due to a bandwidth part configuration, upon receiving the plurality of selectable physical resource block (PRB) bundle sizes.

11. The UE of claim 10, wherein the one or more processors are further configured to process downlink data and one or more associated reference signals according to the selected PRB bundle size.

12. The UE of claim 10, wherein the plurality of selectable PRB bundle sizes includes a first set of PRG values, that includes one or two PRG values, and a second set of PRG values that includes a single PRG value.

13. The UE of claim 12, wherein the one or more processors are configured to select the PRB bundle size as the single PRG value from the second set.

14. A non-transitory computer-readable medium storing one or more instructions for wireless communication, the one or more instructions comprising:
one or more instructions that, when executed by one or more processors of a user equipment (UE), cause the one or more processors to:
receive an indication of a plurality of selectable physical resource block (PRB) bundle sizes;
receive downlink control information (DCI) that does not include a PRB bundling size indicator that indicates a PRB bundle size to be selected from the plurality of selectable PRB bundle sizes; and
selecting a first value from a set of precoding resource block group (PRG) values as a PRB bundling size in response to determining that the received DCI comprises a DCI format 1_1 and in response to determining that the received DCI does not include the PRB bundling size indicator due to a bandwidth part configuration, upon receiving the plurality of selectable physical resource block (PRB) bundle sizes.

15. The non-transitory computer-readable medium of claim 14, wherein the plurality of selectable PRB bundle sizes includes a first set of PRG values, that includes one or more PRG values, and a second set of PRG values that includes a single PRG value, and wherein the UE is configured to select the PRB bundle size as the single PRG value from the second set.

16. An apparatus for wireless communication, comprising:
means for receiving an indication of a plurality of selectable physical resource block (PRB) bundle sizes;
means for receiving downlink control information (DCI) that does not include a PRB bundling size indicator that indicates a PRB bundle size to be selected from the plurality of selectable PRB bundle sizes; and
means for selecting a first value from a set of precoding resource block group (PRG) values as a PRB bundling size in response to determining that the received DCI comprises a DCI format 1_1 and in response to determining that the received DCI does not include the PRB bundling size indicator due to a bandwidth part configuration, upon receiving the plurality of selectable physical resource block (PRB) bundle sizes.

17. The apparatus of claim 16, wherein the plurality of selectable PRB bundle sizes includes a first set of PRG values, that includes one or more PRG values, and a second set of PRG values that includes a single PRG value, and wherein the apparatus is configured to select the PRB bundle size as the single PRG value from the second set.

* * * * *